A. E. WHITE.
SAW SWAGE.
APPLICATION FILED NOV. 4, 1908.
1,021,284.
Patented Mar. 26, 1912.
2 SHEETS—SHEET 2.
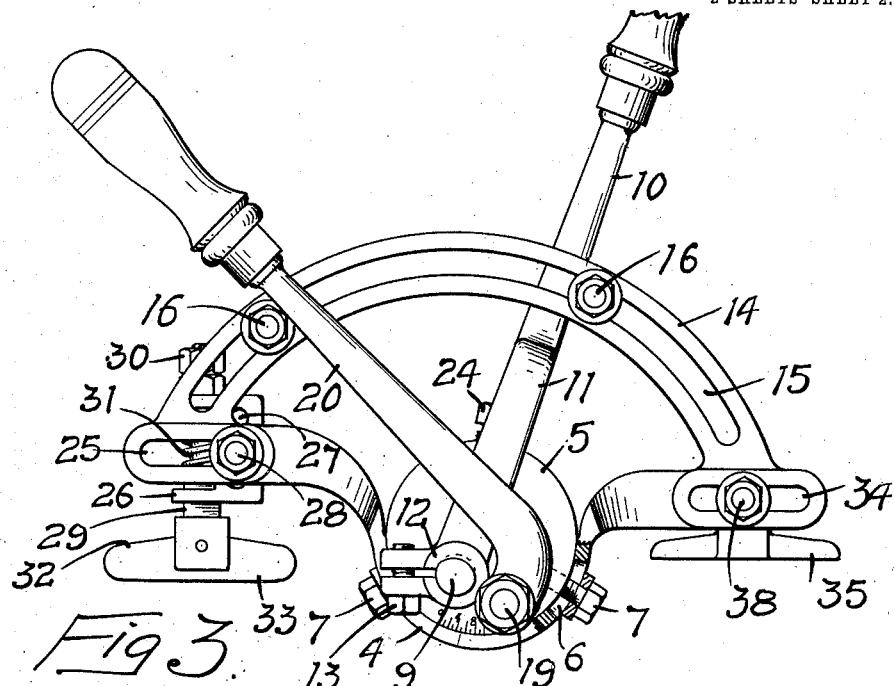
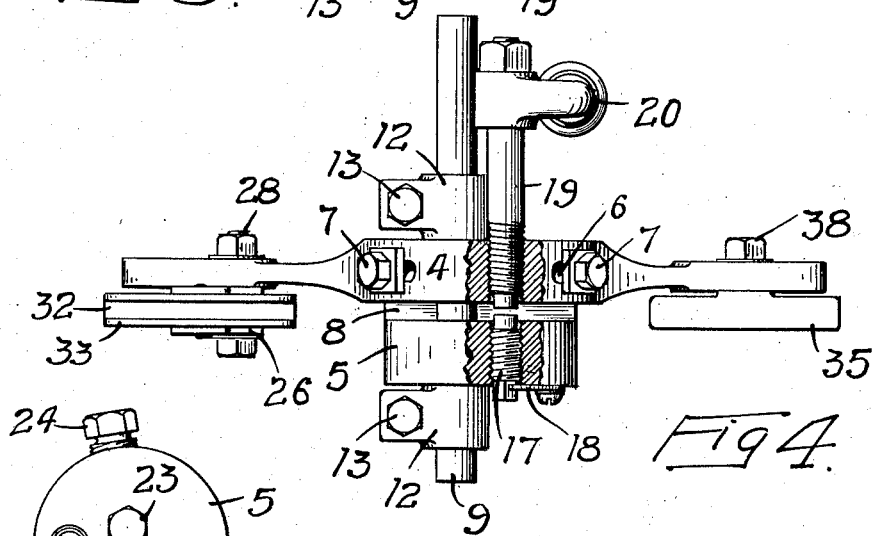
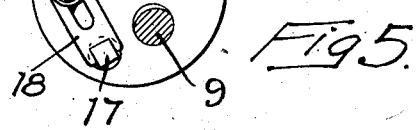
WITNESSES
INVENTOR
ALBERT E. WHITE
BY Paul & Paul
HIS ATTORNEYS though in a somewhat different form.

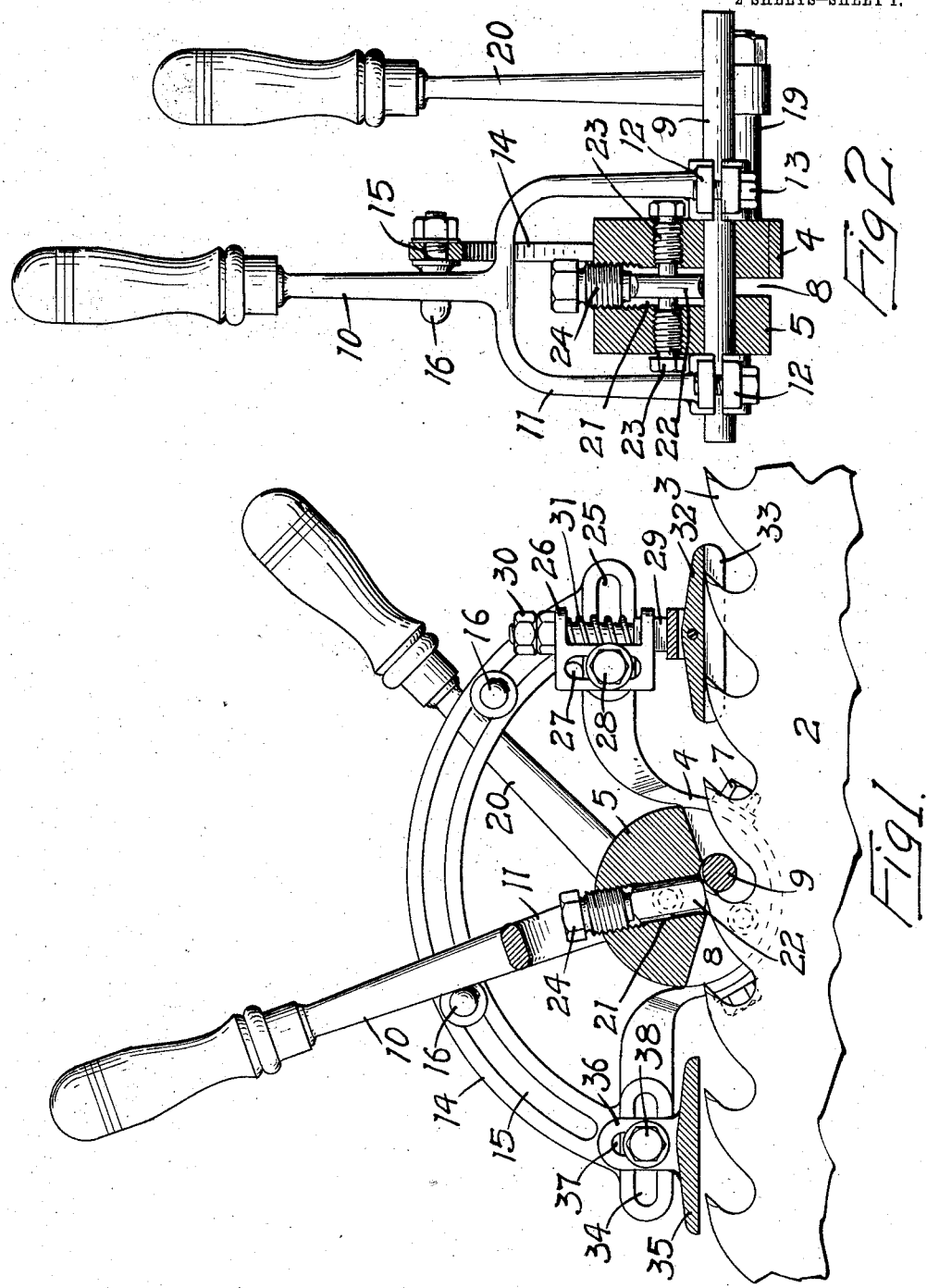

UNITED STATES PATENT OFFICE.

ALBERT E. WHITE, OF EAU CLAIRE, WISCONSIN.

SAW-SWAGE.

1,021,284.   Specification of Letters Patent.   Patented Mar. 26, 1912.

Application filed November 4, 1908. Serial No. 461,055.

*To all whom it may concern:*

Be it known that I, ALBERT E. WHITE, of Eau Claire, Eau Claire county, Wisconsin, have invented certain new and useful Improvements in Saw-Swages, of which the following is a specification.

The object of my invention is to simplify and improve the tool for the same purpose shown and described in Letters Patent of the United States, No. 816,695, issued to me April 3rd, 1906, for an improvement in saw swages.

My invention consists generally in various constructions and combinations, all as hereinafter described and particularly pointed out in the claims.

In the accompanying drawings forming part of this specification, Figure 1 is a sectional view illustrating the application of my improved saw swage to the teeth of a saw, Fig. 2, is a transverse sectional view, Fig. 3, is a side elevation, Fig. 4, is a bottom view, Fig. 5, is a detailed view illustrating the manner of mounting the anvil and die in the swage block.

In the drawing, 2 represents a saw having teeth 3 to be swaged.

4 is a band semi-circular in form and supporting a cylindrical head or block 5. The band is provided with slots 6 through which clamping screws 7 extend into the block and by means of which the block is secured in the frame of the swage and is rendered adjustable therein for the purpose of raising or lowering the die according to the shape of the teeth upon which the tool is working. Block 5 is provided with a centrally arranged slot 8 to receive the saw teeth and a die 9 is mounted in said block transversely with respect to the slot 8 and is capable of adjustment to present new surfaces to the work. The working face of the die is of the same form throughout its length. A lever 10 has a forked end comprising arms 11 which have split hubs 12 in which the die is securely held by means of the clamping screws 13. The hubs bear on the ends of the block 5 and prevent longitudinal movement of the die when the tool is in use, but upon loosening the set screws 13, the die may be moved lengthwise in the hubs to present a new or a different shape to the saw teeth. The opening in the block in which the die is placed is of cylindrical form and the die fits said opening for a portion of its circumference. The wall of the opening in the block therefore forms a bearing surface on which the die turns. The die is preferably made of a straight piece of steel of cylindrical form, cut away or flattened at one side so as to form two working edges extending lengthwise of the die from end to end thereof. The flattened surface is preferably formed on the arc of a circle, so that the surface of the die consists of two partial cylinders, one of greater radius than the other, and having their axes eccentric with respect to each other. This gives the die, in cross section, the form shown in Figs. 3 and 5 of the drawings, the intersecting lines of said cylinders extending, upon opposite sides of the die, lengthwise thereof and forming straight working edges extending from one end of the die to the other. When the die is in position in the block its outer surface fits the opening in the block for a portion of its circumference, and a space is left between the wall of the opening in the block and the flattened face of the die as shown in Fig. 5. The die may be formed in any suitable manner. It may be made from a piece of round steel by milling off one side thereof so as to give it substantially the form shown in Figs. 3 and 5 of the drawings. In this case the milled surface is preferably cut on the arc of a circle of greater radius than the radius of the bar itself. The die may however be formed in any other manner, as by rolling rods to the desired shape and afterward cutting them up to the lengths desired for the dies. In operation the die rocks back and forth in its bearing, and the pressure thereon being in one direction and away from the side which has been milled or otherwise flattened it is not necessary to have the die fit the opening on that side. The working points of the die are on the lines running lengthwise thereof where the curved surfaces intersect each other, and there being two of these lines, one on each side of the center of the die, two working edges are provided extending the full length of the die. As the die becomes worn it can be adjusted lengthwise in the block, in either direction, thereby permitting the use of the working edges nearly to both ends of the die, it being necessary only to have an end of the die grasped by the edge of the split hub on the fork of the handle with sufficient firmness to insure the turning of the die. After one edge of the die has been used for its full length the die may be removed and turned end for end, and the other working edge may then be used in a similar manner for its full length.

The lever 10 is in line with the slot in the head 5 and with the saw teeth and is similar to the lever shown and described in my patent above referred to. An arched bar 14 extends over the head 5 and has a slot 15 therein in which stops 16 are adjustably mounted in the path of the lever 10. A screw 17 is mounted in one side of the head and has a square end that is engaged by a locking plate 18 and a screw 19 is provided in the opposite side of the head and has a lever 20 by means of which it is moved up against the tooth to be swaged, the screw 17 having been previously adjusted, to project into the slot 8 in the head and engage one side of the tooth. In the upper part of the head 5, a socket 21 is formed wherein an anvil 22 is arranged. The socket 21 communicates with the slot 8 and the lower end of the anvil is adapted to form a bearing surface for the tooth during the swaging operation. The anvil is held in place by means of screws 23 which engage the sides of the anvil and a screw 24 fitting into the socket 21 contacts with the outer end of the anvil and prevents outward movement thereof when the tool is in use. Whenever desired, the anvil may be reversed to present a fresh surface to the tooth.

The frame 4 has slots 25 extending longitudinally therein and a bracket 26 has a vertical slot 27 to receive a bolt 28 which when loosened allows vertical adjustment of the bracket thereon or horizontal adjustment in the slot 25. A shank 29 is vertically slidable in the bracket 26 and is provided with nuts 30 and a spring 31 which yieldingly resists upward movement of the shank. The lock nuts 30 are capable of adjustment for the purpose of regulating the tension of the spring and controlling the movement of the shank. A plate 32 is centrally pivoted on the lower end of the shank 29 and has flanges 33 depending upon each side of the teeth 3. The opposite end of the frame has a slot 34 and a plate 35 which bears on the teeth of the saw and has an arm 36 with a slot 37 therein through which a bolt 38 passes and adjustably secures the plate to the frame. A similar mechanism is shown in my patent above referred to.

In saw swages as heretofore constructed the die, when made with more than one working edge, had such working edges in the central portion thereof and extending for only a short length; providing only one or two working points on each edge. When made with working edge the full length, they were so formed as to leave only one line of working points. In either of these constructions the dies are necessarily short lived, and the form used requires careful and accurate machine work, in order to finish the surface of same. The die of my present invention is a straight steel bar, of uniform cross section at all points throughout its length, and with two working edges, similar to each other, extending in straight lines, on opposite sides of the center, and for the full length of the die. This construction not only provides a superior die, with at least twice the wearing life of any swage die heretofore used, but one that is cheaply produced and easily held by the operating lever. The shape is such as to permit of steel being drawn to exact form and does not require any machine work to finish same.

I have illustrated this invention for use in connection with a band saw, but it is adapted for swaging the teeth of gang and circular saws of all types as well as band saws.

I claim as my invention:—

1. In a saw swage, the combination with a block or head having a slot to receive the saw teeth, of a die mounted in said head and adjustable lengthwise therein across said slot, said die consisting of a straight bar, of uniform shape in cross section throughout its length, with its outer surface formed of two partial cylinders eccentrically arranged in relation to each other, and intersecting on straight lines, the lines of intersection forming working edges extending from end to end of the die on each side of the center thereof, said die being reversible end for end to bring either edge into working position, and means for operating said die.

2. In a saw swage, the combination with a block or head having a slot to receive the saw teeth, of a die mounted in said head and adjustable lengthwise therein across said slot, said die consisting of a straight bar of uniform shape in cross section throughout its length, a portion of its outer surface being formed of a partial cylinder, with a working edge, on each side of the center, extending from end to end of the die, said die being reversible, end for end, to bring either working edge into operating position, and means for operating said die.

3. In a saw swage, a block or head having a slot to receive the saw teeth, a die mounted in said head and adjustable therein across said slot, one side of said die being milled off to a true radius and the other side of said die forming a bearing surface in the block, the meeting points of said milled surface and said bearing surface forming like working edges extending from end to end of the die on each side of the center thereof, whereby said die is adapted to be removed from said head when one side is worn and turned end for end to bring the other side into working position, an operating lever having a forked end, the arms of said fork having split hubs thereon to receive said die, and clamping screws for securing said hubs on said die, the inner ends of said hubs contacting with said head and holding said die against longitudinal movement during the swaging operation.

4. In a saw swage, the combination with a block or head having a slot to receive the saw teeth, of a die mounted in said head and adjustable lengthwise therein across said slot, said die consisting of a straight bar of uniform shape in cross section throughout its length, with a working edge on each side of the center, both of said working edges being alike and said die being reversible, end for end to bring either working edge into operating position, and means for operating said die.

5. In a saw swage, the combination with a block or head having a slot to receive the saw teeth, of a die mounted in said head and adjustable lengthwise therein across said slot, said die consisting of a straight bar of uniform shape in cross section throughout its length, with a portion of its surface formed of a partial cylinder, and the remaining portion flattened, whereby a working edge is provided on each side of the center of the die extending from end to end thereof, both of said working edges being alike and said die being reversible to bring either working edge into operating position, and means for operating said die.

6. In a saw swage, the combination with the cylindrical head or block 5 having a transverse opening to receive a die and a slot 8 at right angles to the die opening to receive the saw teeth, of a frame provided with a band 4 engaging and supporting the block at one side only of the said slot 8, said frame being provided at its end with the horizontal slots 25 and 34 and with the arched bar 14 having the slot 15, a plate 35 pivotally and adjustably mounted on the side of frame and in the slot 34, a bracket 26 mounted on one side of frame and in the slot 25, means for vertically and horizontally adjusting said bracket, a shank 29 yieldingly mounted in said bracket 26, and the plate 32 pivoted on the lower end of the shank 29, substantially as described.

7. In a saw swage, the combination with a head or block having a transverse die receiving opening and a slot to receive the saw teeth, of a frame provided with a band engaging and supporting said block, said frame being provided at one end with a pivoted plate 35 and at its other end with a horizontal slot 25, a bracket 26 provided with a vertical slot 27, a bolt 28 passing through the slot 27 and through said slot 25, whereby the bracket 26 is capable of vertical and horizontal adjustment, the shank 29 mounted in said bracket and provided with adjustable nuts 30, a spring 31 yieldingly engaging said shank 29 and a plate 32 pivoted on the lower end of said shank, substantially as described.

In witness whereof, I have hereunto set my hand this nineteenth day of October, 1908.

ALBERT E. WHITE.

Witnesses:
HERMAN STOCKHAUSEN, Jr.,
F. C. BARLOW.

Copies of this patent may be obtained for five cents each, by addressing the "Commissioner of Patents, Washington, D. C."